BY

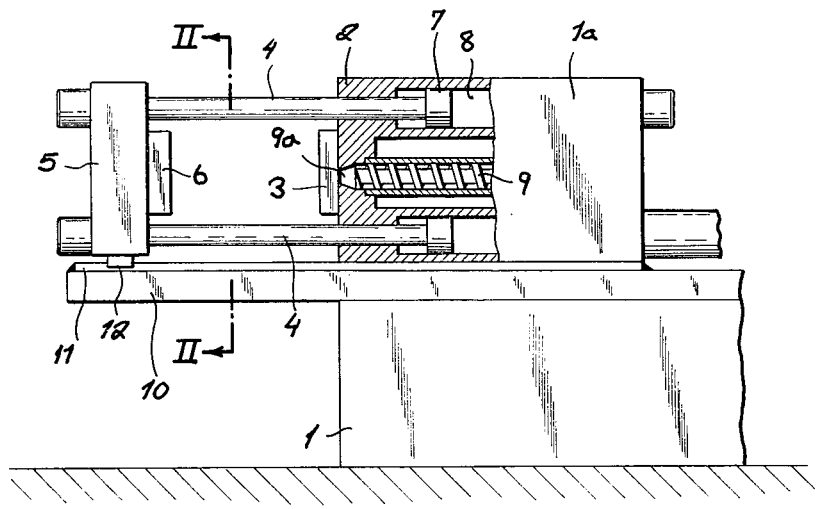
FIG. I
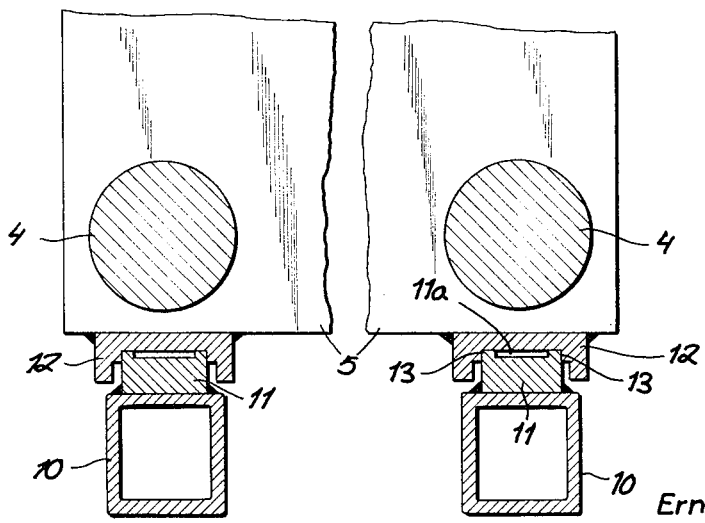
FIG. 2
Ernst Sauerbruch
Donat Scherrer
Willy Vogt
INVENTORS.
BY
Karl J. Ross
Attorney Ernst Sauerbruch
Donat Scherrer
Willy Vogt
INVENTORS.

Karl F. Ross
Attorney

INVENTORS:
Ernst Sauerbruch
Donat Scherrer
Willy Vogt
BY Karl J. Ross
Attorney

INVENTORS:
Ernst Sauerbruch
Donat Scherrer
Willy Vogt

BY Karl J. Ross
Attorney

Ernst Sauerbruch
Donat Scherrer
Willy Vogt
INVENTORS.

BY Karl F. Ross
Attorney

United States Patent Office 3,674,400
Patented July 4, 1972

3,674,400
INJECTION-MOLDING MACHINE WITH OVER-
HANGING PLATEN SUPPORT
Ernst Sauerbruch, Stein am Rhine, Donat Scherrer, Buch,
and Willy Vogt, Zurich, Switzerland, assignors to Fahr
Bucher G.m.b.H. Gottmadingen, Gottmadingen, Kreis
Konstanz, Germany
Filed Mar. 23, 1970, Ser. No. 21,768
Claims priority, application Germany, Mar. 26, 1969,
P 19 15 394.7; June 20, 1969, P 19 31 432.0
Int. Cl. B29f 1/00
U.S. Cl. 425—225
8 Claims

ABSTRACT OF THE DISCLOSURE

The movable platen of an injection-molding machine, secured to a set of horizontal piston rods, is rested on a track projecting endwise beyond the machine bed, thereby simplifying the collection of molded articles ejected in the open-mold position. The track may be simply cantilevered or braced, preferably adjustably, against the machine frame. To compensate for possible deflection of the cantilevered track under the weight of the platen, its working surface may be slightly inclined so as to rise with increasing distance from the bed; alternatively, an expanding brace may be interposed between the track and the platen to help maintain the latter on a horizontal guide path.

Our present invention relates to an injection-molding machine of the type wherein one of the components of a split mold is carried by a platen which is horizontally movable with reference to another platen (hereinafter called the fixed platen) secured to the machine frame with no or only very limited mobility.

In the usual injection molding machine with horizontal machine bed, the movable platen is slidably mounted on a set of horizontal tie bars extending between the fixed platen and another stationary support; a fluid-actuated ram on that support displaces the movable platen on its tie bars to open and close the mold in timed relationship with an injection mechanism usually positioned on the side of the fixed platen. Upon the opening of the mold, the molded article or articles are ejected from its cavity or cavities to drop through an aperture in the machine bed into a collecting receptacle or onto a moving conveyor belt.

The need for thus aperturing the bed weakens the machine frame, particularly in the case of bulky articles to be molded. Attempts to obviate this problem by having the movable platen slide outwardly on its tie bars beyond the end of the machine bed, thereby letting the molded article fall onto a conveyor or the like next to the bed, have been only limitedly successful. Aside from requiring a relocation of the mold drive, the slidable mounting of the platen on the free ends of a set of cantilevered tie bars tends to deform these bars so that accurate guidance and precise closing of the mold becomes difficult.

The general object of our present invention, therefore, is to provide an improved mounting for a movable platen which avoids the aforestated inconveniences while allowing the ejection of the molded articles to take place outside the machine bed.

This object is realized, pursuant to our present invention, by the provision of a track extending endwise from the frame beyond the machine bed and co-operating with track-engaging means on the movable platen.

With this arrangement, the movable platen no longer requires tie bars for its guidance but can be reciprocated along the track with the aid of a set of horizontal piston rods projecting above the track from hydraulic or pneumatic cylinders rigid with the frame, the piston rods being stressed only longitudinally without being subjected to any bending moment.

The track-engaging means may include rollers or shoes and, in the latter case, may advantageously interlock with the track for positive lateral guidance, e.g. by a dovetail fit. The contact surfaces of the track and/or the shoe or shoes may be coated with an antifriction agent, such as Teflon, to enhance their slidability.

In a simple case, the track may be constituted by a pair of parallel beams extending substantially horizontally on opposite sides of the longitudinal median plane of the machine bed. If these beams are cantilevered, they will be somewhat deflected by the weight of the platen when the mold is opened; in order to provide accurate guidance even under these circumstances, a more particular feature of our invention calls for a slight inclination of their bearing surfaces in the unloaded state of the beams so that these surfaces slope upwardly in the direction away from the machine bed. As the deflection of a cantilevered beam is substantially proportional to the distance of the load from the point of support, proper compensation of the loading effect may be had with the aid of a wedge-shaped overlay forming a bearing surface above the substantially horizontal beam proper. It is, of course, also possible to mount the beam itself on the frame at the desired small angle to the horizontal.

Alternatively, or in combination with the foregoing, the track-engaging rollers or shoes may be adjustably secured to the movable platen to allow exact compensation of unavoidable manufacturing tolerances; for the same purpose the projecting ends of the beams may be braced against the floor or directly against the machine frame with the aid of extensible struts.

Another specific feature of our invention resides in the provision of a yieldable force-storing means, such as a spring or a pneumatically loaded piston, between the movable platen and its track-engaging means to compensate for manufacturing tolerances and for deflection of the track under load, especially in the case of a cantilevered beam or beams.

The above and other features of the invention will be described hereinafter with reference to the accompanying drawing in which:

FIG. 1 is a side-elevational view, partly in section, of the principal elements of an injection-molding machine embodying our invention;

FIG. 2 is an enlarged cross-sectional view taken on the line II—II of FIG. 1;

Figure 3:
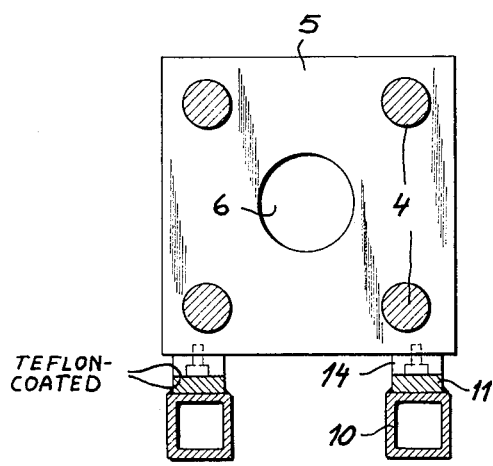
FIGS. 3 and 4 are views similar to FIG. 2, illustrating certain modifications.

Reference will first be made to FIGS. 1 and 2 showing at 1 the bed of a horizontal injection-molding machine, this bed being part of a frame with an extension 2 which forms a cluster of hydraulic cylinders 8 occupied by respective pistons 7. Piston rods 4, projecting horizontally from these cylinders, are slidably guided in the left-hand part of frame portion 2 (as viewed in FIG. 1) which may be regarded as a fixed platen and which carries a stationary mold half 3 whose cavity or cavities, not shown, communicate with an injection orifice 9a of a conventional plasticizing unit including an axially reciprocable and rotatable feed screw 9. The free ends of piston rods 4 are fixedly secured to a movable platen 5 which carries a second mold half 6; in the open-mold position illustrated in FIG. 1, the mold halves 3 and 6 are spaced apart beyond the end of bed 1 so that their products may fall into a receptacle or onto a conveyor positioned next to the machine the freely accessible space below the path of the platen.

The movable platen 5, displaceable into a closed-mold position with the aid of the hydraulic pistons 7, rests on a track which in this embodiment is constituted by a pair of parallel beams 10 cantilevered on frame 1, 2. As best seen in FIG. 2, the beams 10 are overlain by respective strips 11 which form accurately machined bearing surfaces for a pair of track-engaging shoes 12 straddling these strips with a positive fit; thus, each overlay 11 forms a pair of raised shoulders in sliding contact with respective edges 13 of the associated shoes. The upper surface of each strip is shown recessed at 11a to reduce the area of contact and therefore the frictional resistance.

Figure 4:
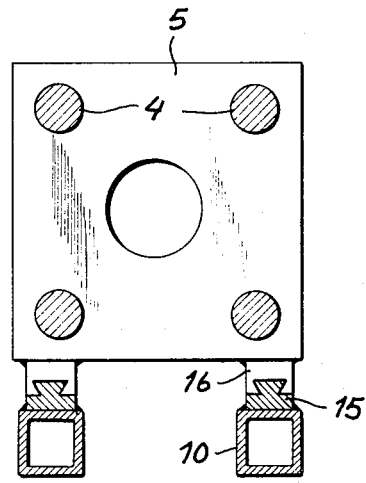

As shown in FIG. 3, two modified strips 11 may be in broad-area contact with flat shoes 14 without positive lateral guidance, their respective contact surfaces being provided with antifriction agents such as Teflon coatings. Naturally, such coatings may also be used in other embodiments wherein a shoe engages a bearing strip with sliding fit, e.g. in the arrangement of FIG. 4 where strips 15 and shoes 16 are of complementary dovetail profiles.

Figure 6:
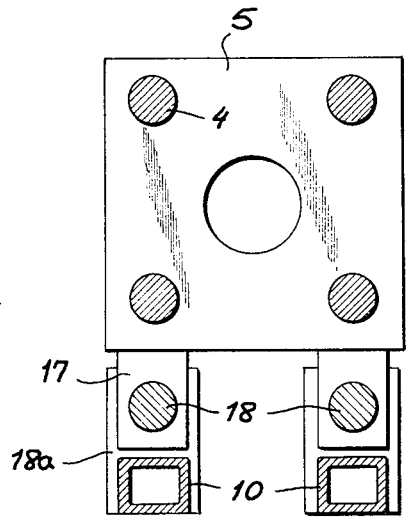
FIG. 6 is a cross-sectional view taken on the line VI—VI of FIG. 5.
Figure 5:
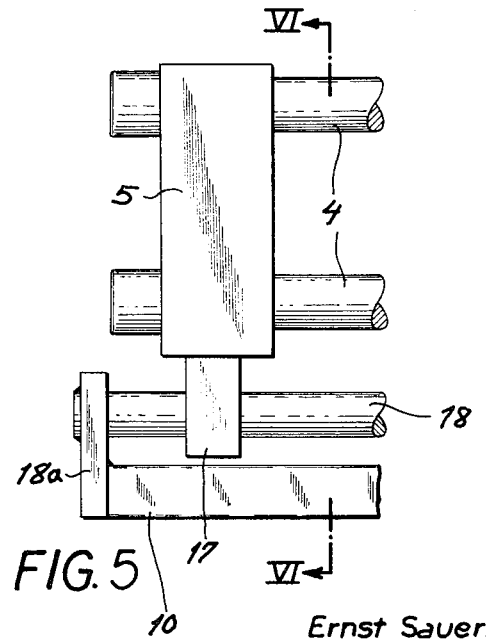
FIG. 5 is a fragmentary elevational view, illustrating another modification.

FIGS. 5 and 6 show a pair of rods 18 supported on beams 10 with the aid of upstanding lugs 18a, the platen 5 being provided with depending lugs 17 traversed by the rods 18. These rods, of course, and/or the contact surfaces of lugs 17 could also be Teflon-coated.

Figure 8:
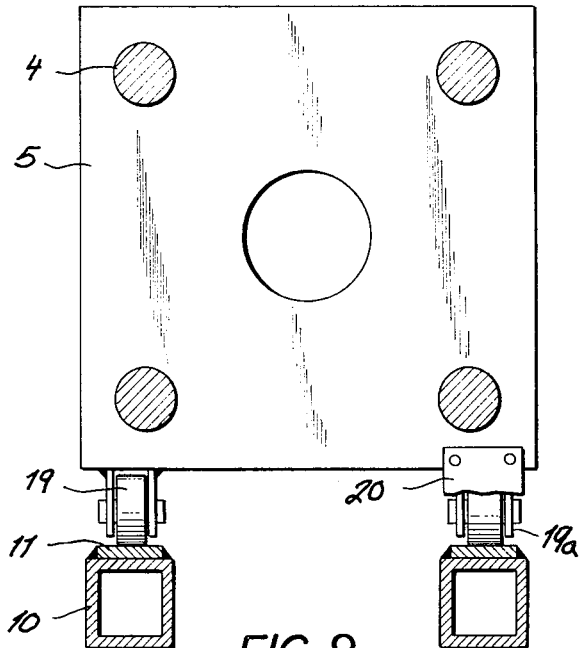
FIG. 8 is a cross-sectional view taken on the line VIII—VIII of FIG. 7.
Figure 7:
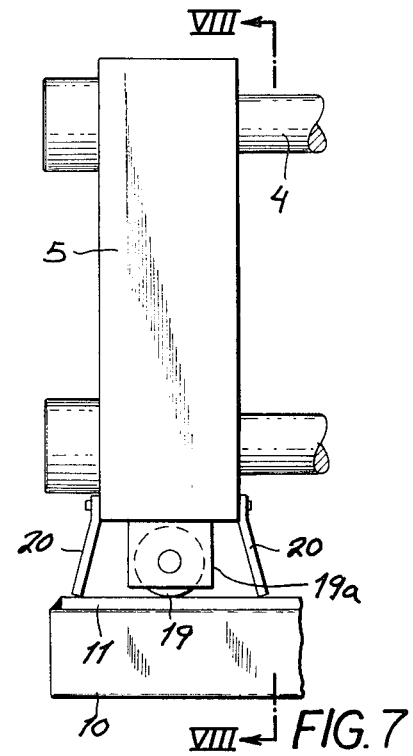
FIG. 7 is a further view similar to FIG. 5, illustrating still another variant.

As shown in FIGS. 7 and 8, rolls 19 journaled in brackets 19a may ride the strips 11 in lieu of the shoes of the preceding embodiments. In this case, advantageously, each roller is bracketed by a pair of wiper blades 20 sweeping the track to the front and to the rear of the roller. By thus removing solid particles (e.g. dust of plastic molding material) liable to settle on the track surfaces, these wipers insure an accurate running of the rollers on the beams 10.

Figure 10:
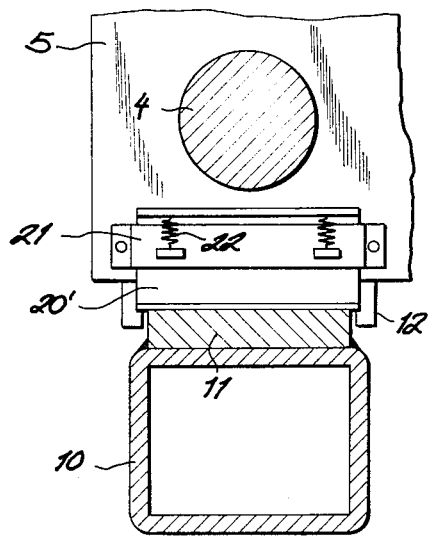
FIG. 10 is a cross-sectional view taken on the line X—X of FIG. 9.
Figure 9:
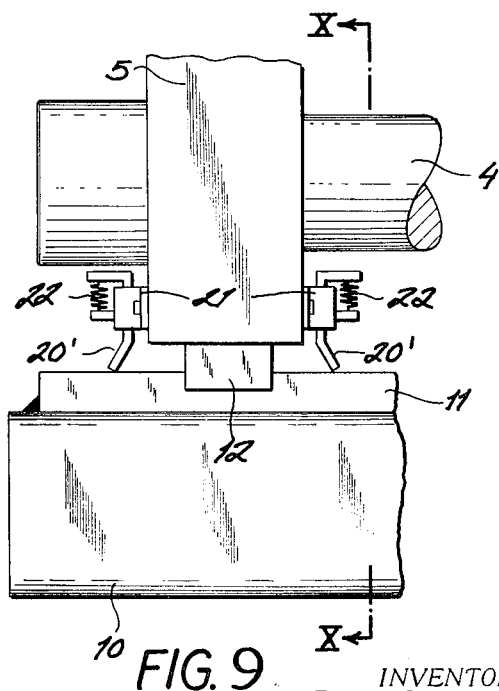
FIG. 9 is a fragmentary side-elevational view like FIG. 7, showing yet another embodiment.

In FIGS. 9 and 10 we show, in an assembly otherwise similar to that of FIGS. 1 and 2, a pair of modified wipers 20' which are vertically slidable in brackets 21 on platen 5 and are urged downwardly, against the bearing strip 11, by means of tension springs 22.

Figure 11:
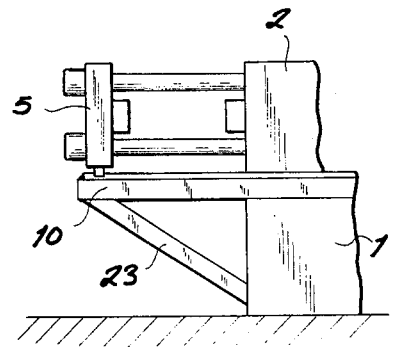
FIGS. 11 and 12 are views similar to FIG. 1, illustrating two additional embodiments.
Figure 12:
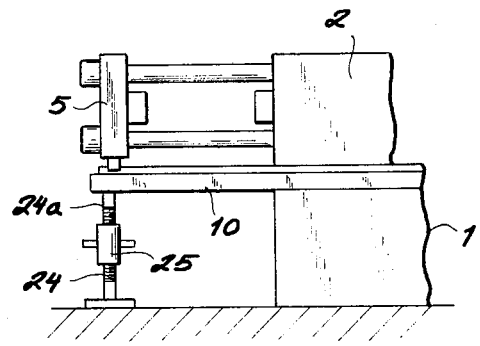

As shown in FIG. 11, each beam 10 may be braced against the machine bed 1 with the aid of an inclined strut 23. According to FIG. 12, a threaded strut 24 (here resting against the floor) may be provided with a turnbuckle 25 also engaging an oppositely threaded companion strut 24a whereby the level of the free end of the beam can be adjusted.

Figure 13:
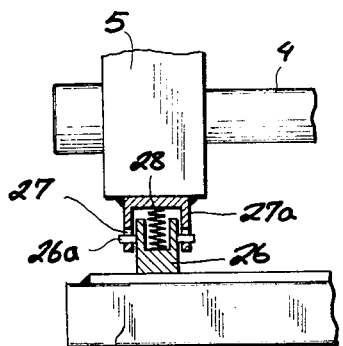
FIGS. 13–16 are enlarged detail views generally similar to FIG. 9, showing other modifications.

FIG. 13 shows a compression spring 28 interposed between the platen 5 and its shoe 26 which has a pair of pins 26a guided in vertical slots 27 of a bracket 27a rigid with the platen. Spring 28 exerts a downward pressure upon the shoe 26 to maintain the platen spaced at a desired level above the beam 10 while yielding in the presence of surface irregularities.

Figure 14:
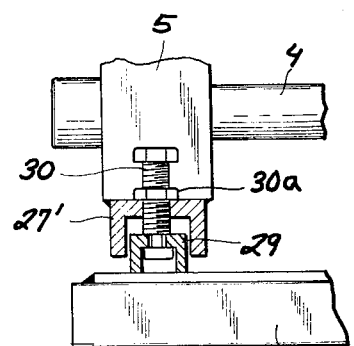

In FIG. 14 I have shown a shoe 29 adjustably mounted in a bracket 27', laterally projecting from platen 5, with the aid of a bolt 30 threadedly engaging this bracket and locked in position by a nut 30a.

Figure 15:
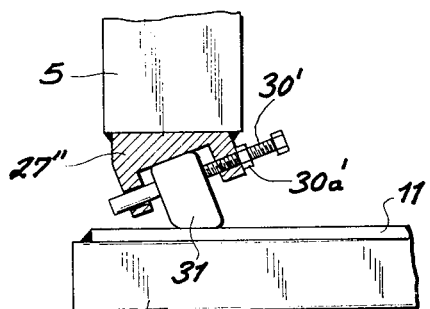

FIG. 15 illustrates the possibility of a similar adjustment in the vertical distance between platen 5 and bearing strip 11 with the aid of a shoe 31 of generally trapezoidal outline mounted in a bracket 27" by means of an oblique bolt 30' with a lock nut 30a'.

Figure 16:
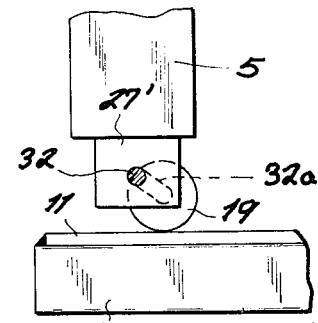

According to FIG. 16, a roller 19 is journaled in a pair of arms 32a (only one shown) each rigid with an eccentric pin 32 which traverses the bracket 27' and can be screwed tight onto the bracket so as to lock the arm 32a at a selected angle of inclination, thereby again varying the elevation of platen 5 above strip 11.

Figure 17:
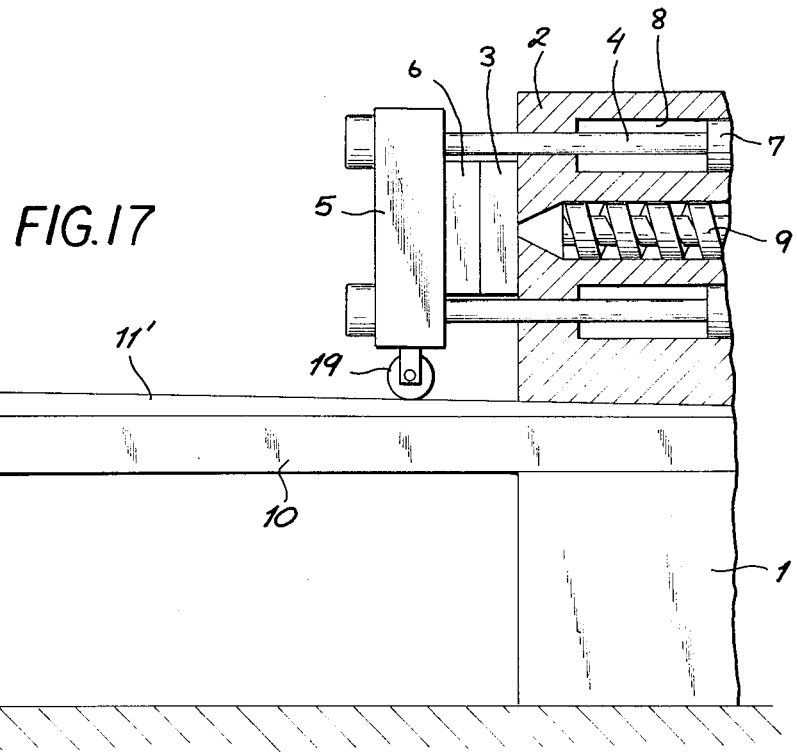
FIGS. 17 and 18 are side-elevational views (the former partly in section) generally similar to FIG. 1, illustrating still another injection-molding machine according to the invention in open and closed position of its mold, respectively.
Figure 18:
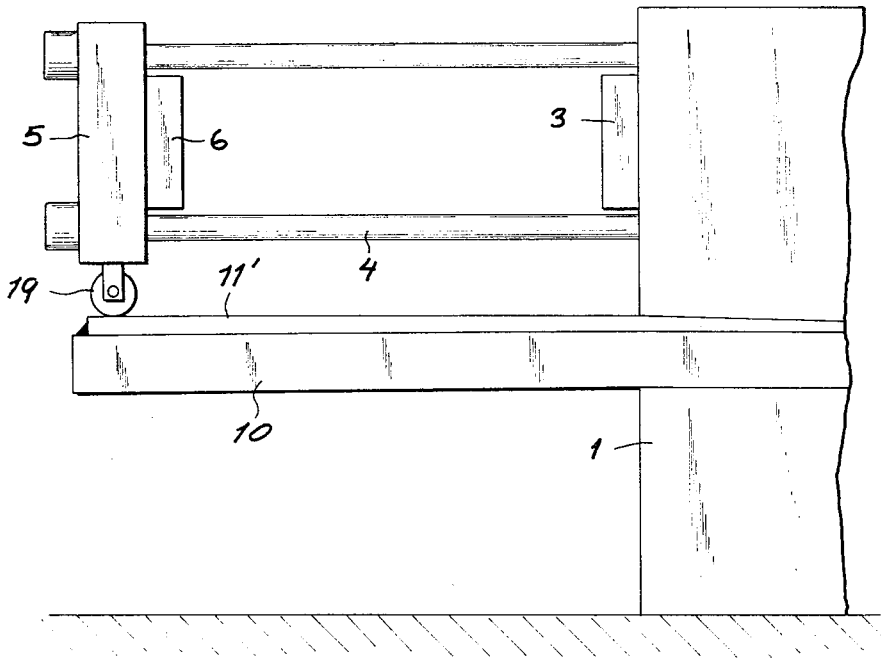

In FIGS. 17 and 18 we show each beam 10 provided with a wedge-shaped strip 11' forming a bearing surface which is slightly inclined to the horizontal in the closed-mold position of FIG. 17, to an extent counteracting the deflection of the beam under the load of platen 5 when the latter is moved out into the open-mold position of FIG. 18; thus, the guide path for the platen-supporting rollers 19 remains horizontal, provided the deflection of the beams does not exceed their elastic limit, so that the piston rods 4 are not deformed when sliding in frame portion 2.

Figure 19:
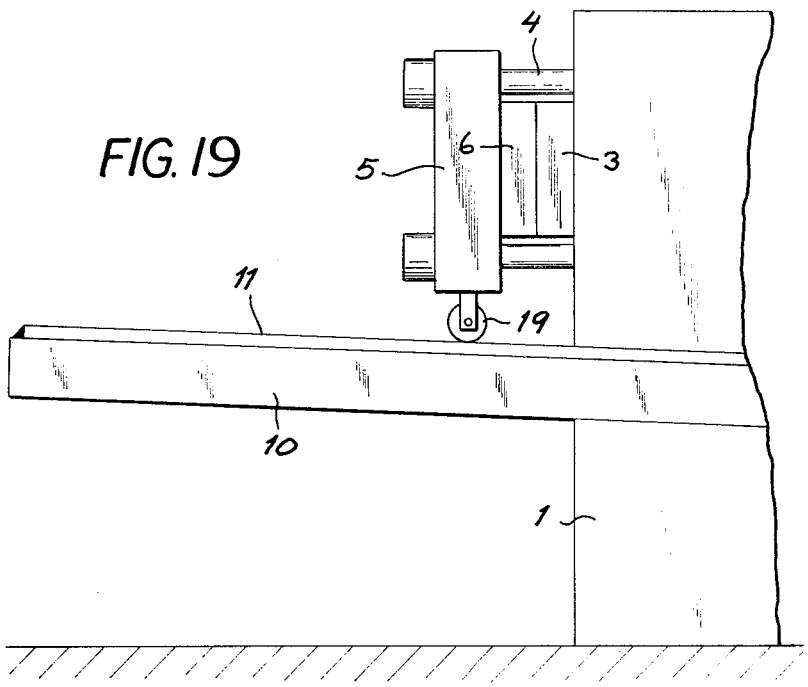
FIGS. 19 and 20 are two views similar to FIGS. 17 and 18, respectively, relating to a slightly altered construction.
Figure 20:
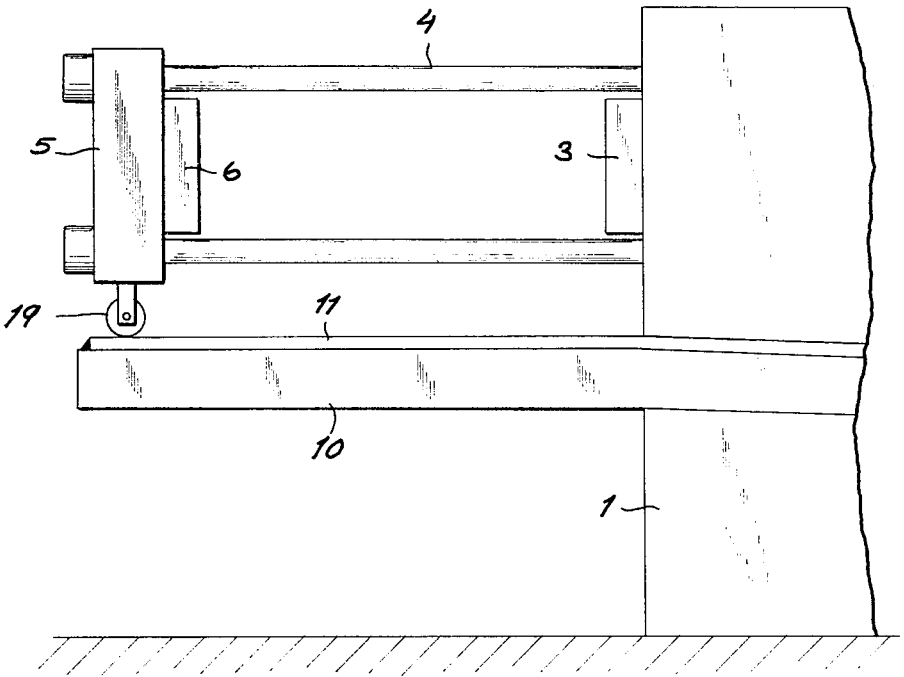

In FIGS. 19 and 20 we accomplish a similar result by upwardly inclining the beams 10 without changing the shape of the strips 11 as compared with the embodiments first described. Again, the angle of inclination is so chosen that the bearing surface is horizontal in the open-mold position of FIG. 20.

Figure 21:
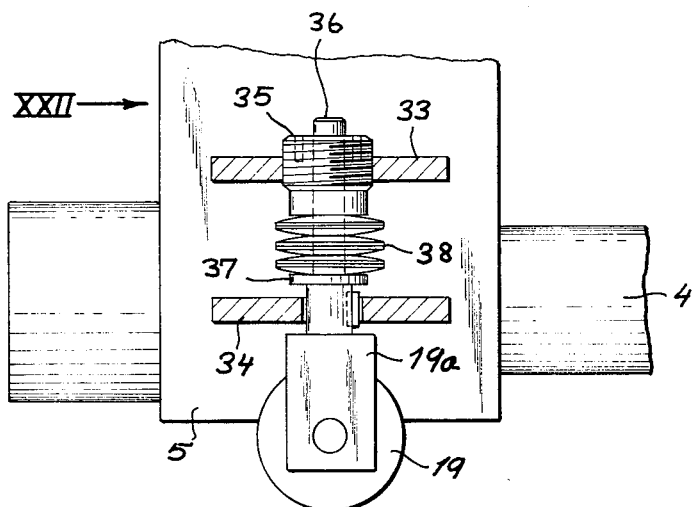
FIG. 21 is again a fragmentary side view generally similar to FIG. 9, depicting yet a further variant.
Figure 22:
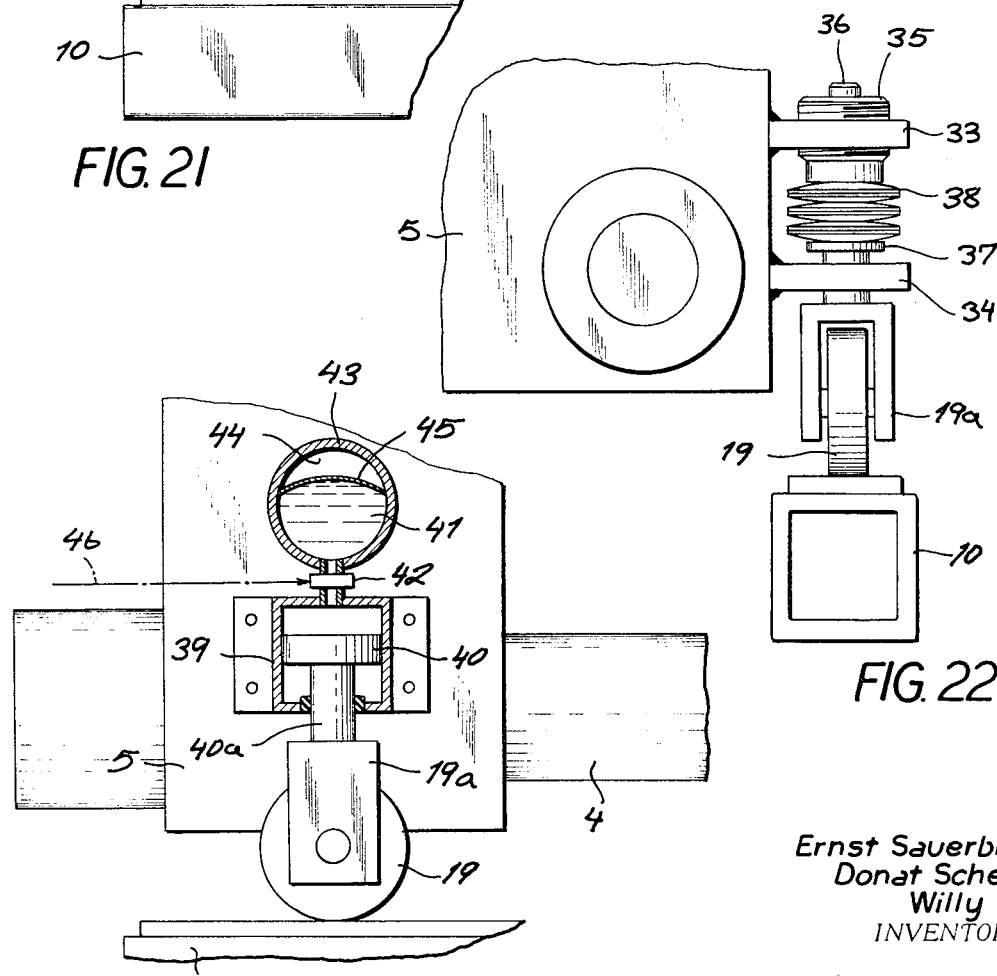
FIG. 22 is an end view taken in the direction of arrow XXII in FIG. 21.

FIGS. 21 and 22 illustrate a modification of the arrangement of FIG. 13 which allows for manual adjustment of the biasing force acting upon a roller-supporting bracket 19a. A pair of lugs 33 and 34 project laterally from platen 5, on each side thereof, and are traversed by a stem 36 integral with bracket 19a. A set of Belleville springs 38 surround the stem 36 between lugs 33 and 34, bearing upon a shoulder 37 of the stem; an externally threaded disk 35 is screwed into the upper lug 33 whereby the pressure of the Belleville springs can be adjusted by manual rotation of the disk. The spring pressure, which together with that of the other spring set (not shown) should balance the weight of the platen 5 and of the mold half carried thereon, may thus be adjusted to allow for exact compensation of the loading effect with molds of different weight.

Figure 23:
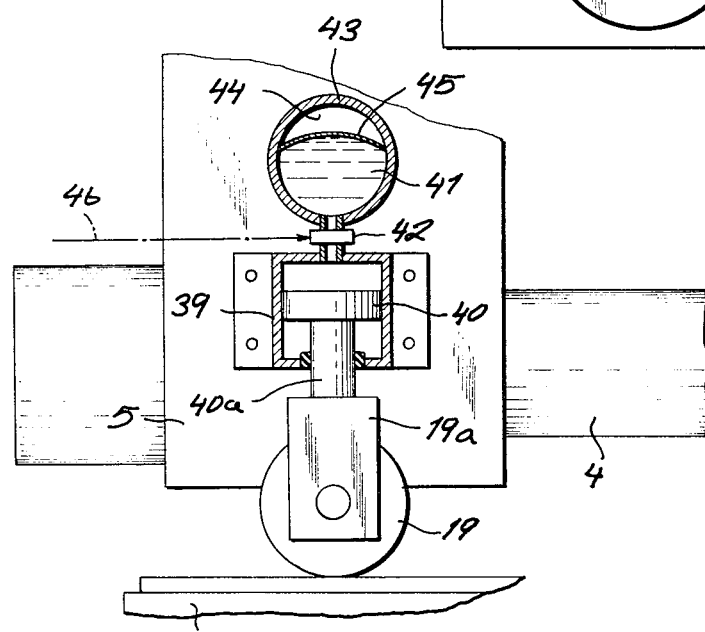
FIG. 23 shows a final variant in a view akin to that of FIG. 21.

In FIG. 23 we have shown a generally similar arrangement wherein the biasing force acting upon brackets 19a is furnished by hydraulic fluid 41 delivered from a reservoir 43 via a throttle valve 42 to a cylinder 39 in which a piston 40 is vertically slidable, the rod 40a of this piston being rigid with bracket 19a. The hydraulic fluid 41 is under pressure of a gas cushion 44, through the intermediary of a flexible membrane 45, and its loading effect upon the roller 19 can be varied by manually adjusting the throttle valve 32. This valve could also be automatically adjusted, with the aid of a control circuit diagrammatically indicated at 46, to provide a progressively increasing loading pressure as the platen moves outwardly along beam 10; a second valve, not shown, may be similarly controlled by the circuit 46 to allow for the return of excess oil to the intake side of a circulating pump, feeding the reservoir 43, during the closing stroke of the platen.

It is to be understood that, to the extent of their compatibility, features shown in different embodiments can be combined or substituted for one another within the scope of our invention.

We claim:

1. In an injection-moulding machine with a frame resting on a floor, said frame forming a machine bed rising to an elevated level above the floor, mold-supporting means on said frame including a fixed part and a cooperating horizontally reciprocable platen, and mechanism including a set of fluid-actuated horizontal piston rods for so reciprocating said platen, said piston rods having free ends secured to said platen, the combination therewith of:

- a track projecting endwise from said frame at said elevated level beyond the machine bed above a freely accessible space, said piston rods being slidably guided in said frame for movement above said track;
- track-engaging means on said platen bearing upon said track, said fixed part being located at an end of said bed, said platen being reciprocable along said track between a closed-mold position proximal to said end and an open-mold position remote from said end; and
- yieldable force-storing means inserted between said platen and said track-engaging means to bear upon the latter for compensating deformation of said track under load with reference to said piston rods.

2. The combination defined in claim 1 wherein said track comprises a pair of transversely spaced parallel beams symmetrically disposed with reference to a longitudinal midplane of said bed.

3. The combination defined in claim 2 wherein said beams are provided with overlays forming bearing surfaces for said track-engaging means.

4. The combination defined in claim 2 wherein said track-engaging means comprises a pair of rollers respectively riding said beams.

5. The combination defined in claim 1, further comprising adjustment means coupled with said track-engaging means for varying the height of said platen above said track.

6. The combination defined in claim 1 wherein said force-storing means comprises a spring mounting.

7. The combination defined in claim 1 wherein said force-storing means comprises a source of pressure fluid.

8. The combination defined in claim 7 wherein said source is provided with valve means for controlling the force exerted upon said track-engaging means by said pressure fluid.

References Cited

UNITED STATES PATENTS

| | | | |
|---|---|---|---|
| 617,414 | 1/1899 | Doughty | 18—17 E |
| 2,013,587 | 9/1935 | Stacy | 18—17 H |
| 2,365,849 | 12/1944 | Strauss | 18—16 F |
| 2,447,256 | 8/1948 | Knowles | 18—30 LT X |
| 3,015,849 | 1/1962 | Mittelstadt et al. | 18—30 LV |
| 3,120,039 | 2/1964 | Stubble et al. | 18—30 LV UX |
| 3,008,189 | 11/1961 | Harvey | 18—30 LB |
| 3,262,158 | 7/1966 | Von Reimer et al. | 18—30 LA |
| 3,103,701 | 9/1963 | Calchera et al. | 18—30 LT X |
| 3,141,192 | 7/1964 | Benedetto | 18—30 LT X |
| 2,607,100 | 8/1952 | Urachel | 25—131 SC |
| 2,932,874 | 4/1960 | Ludwig et al. | 25—2 X |
| 3,134,157 | 5/1964 | Pinner | 25—131 SC X |

FOREIGN PATENTS

| | | | |
|---|---|---|---|
| 43,442 | 12/1965 | Germany | 18—30 LV |
| 1,127,069 | 4/1962 | Germany | 18—30 LV |

J. HOWARD FLINT, JR., Primary Examiner

U.S. Cl. X.R.

425—242